April 28, 1931.  H. S. WALTHERS  1,802,992
CIRCULAR CUTTER MOUNTING
Filed July 22, 1929

Inventor
Harry S. Walthers,
By Cromwell, Greist & Warden
Attys.

Patented Apr. 28, 1931

1,802,992

UNITED STATES PATENT OFFICE

HARRY S. WALTHERS, OF BELOIT, WISCONSIN, ASSIGNOR TO YATES-AMERICAN MACHINE COMPANY, OF BELOIT, WISCONSIN, A CORPORATION OF DELAWARE

CIRCULAR-CUTTER MOUNTING

Application filed July 22, 1929. Serial No. 379,962.

The present invention has to do with cutter heads, and is concerned more particularly with the way in which circular cutters are retractibly mounted on such heads.

The primary purpose of the invention is to provide a simple, rigid mounting for circular cutters which is novel in construction, arrangement and operation, holds the cutters firmly in cutting positions, and permits the cutters to be swung back easily into inoperative positions when other knives on the head are to be jointed.

Other objects and advantages of the invention will be apparent upon a full understanding of the nature of the improved mounting.

In order that the invention may be readily understood, one form of the same is set forth herein by way of illustration, it being, of course, understood that the invention may be incorporated in other structurally modified forms coming equally within the contemplated scope of the appended claims.

Figure 1:
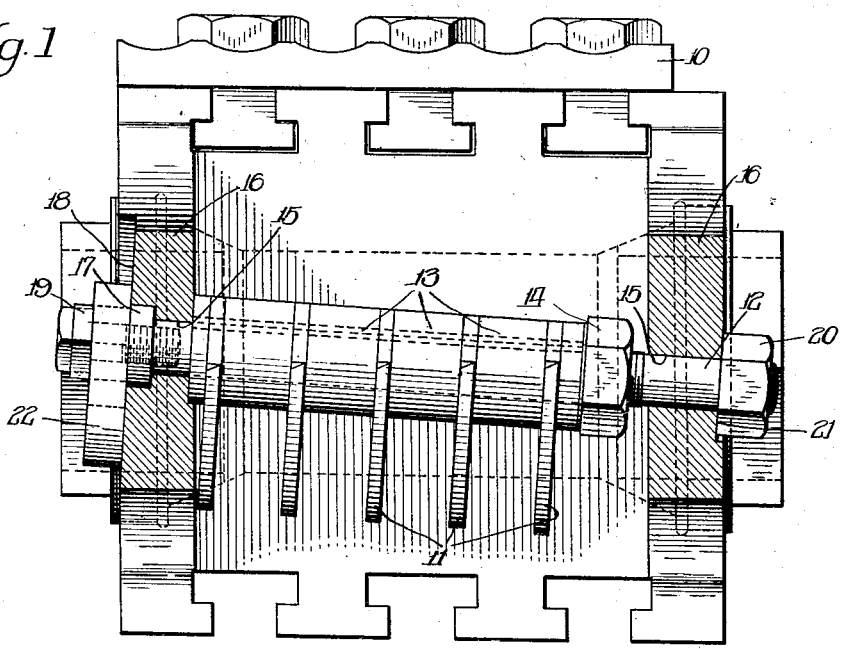
Figure 2:
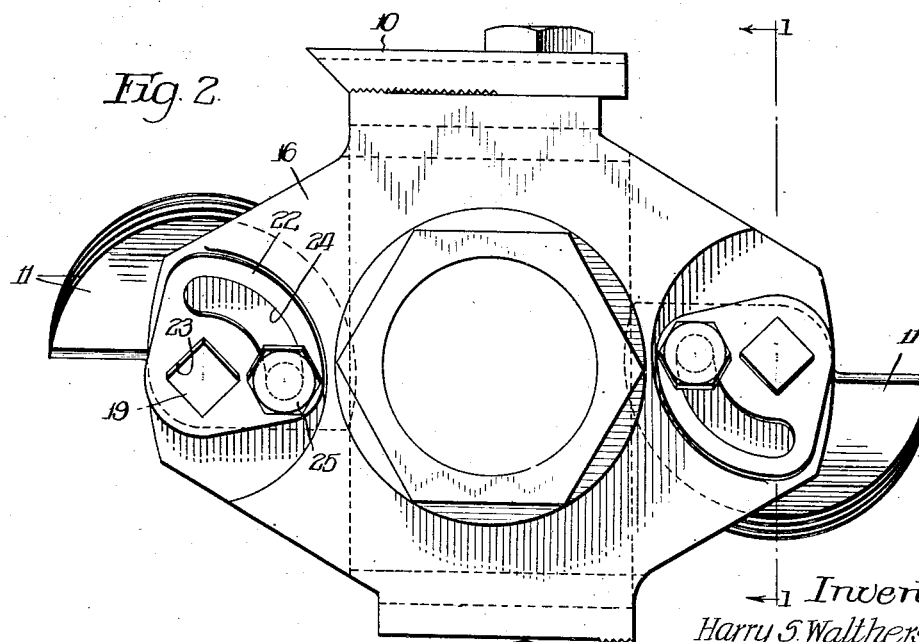

In the accompanying drawing:

Fig. 1 is a partially sectioned face view of a cutter head equipped with the circular cutter mounting of the invention, the section being taken on the line 1—1 of Fig. 2; and Fig. 2 is an end view of the cutter head.

The cutter head shown in the drawing carries two oppositely disposed moulding knives 10 and two oppositely disposed rows of circular splitting cutters 11. The cutters 11 are mounted in such a way as to permit the same to be swung back within the cutting circle of the knives 10 when the latter are to be jointed; and the present invention resides in the novel mounting of the cutters 11.

The cutters 11 in each row are keyed to a shaft 12 and are separated from each other along the shaft by spacing collars 13. The cutters and the collars are held together by an adjustably positioned nut 14 on the shaft which permits the use of more or less cutters.

The shaft 12 is canted slightly with respect to the axis of the cutter head, and the ends of the shaft are rotatably supported in apertures 15 formed in ears 16 which project radially from the ends of the head as integral portions thereof. One end of the shaft is provided with a cylindrical enlargement 17 which seats within a countersunk portion of the aperture 15 in the adjacent ear, and the other end of the enlargement projects outwardly beyond a perpendicularly cut surface 18 on the ear and is formed with a square head 19 for a purpose hereinafter explained. The other end of the shaft is screw threaded and is engaged by a nut 20 which fits against a perpendicularly cut surface 21 on the other ear.

A sector-shaped member 22 is positioned against the surface 18 and has a square hole 23 at its center of curvature through which the square head 19 on the shaft extends in non-rotatable association therewith. The member 22 is provided with an arc-shaped slot 24 at a distance from the shaft, and a cap screw 25 extends through the slot into a threaded aperture in the ear. When the screw 25 is tightened, it serves to clamp the member 22 tightly against the ear, whereby to hold the shaft and the cutters from turning. The cutters—which are shown in the drawings in their cutting positions—may be swung back within the cutting circle of the moulding knives when the screw is loosened, and may be held in their inoperative positions by tightening the screw.

The leverage provided by the member 22 eliminates any possibility of slippage occurring, and permits all of the cutters in each row to be quickly released and swung in or out as a unit.

I claim:

1. In a cutter head, a shaft rotatably mounted in the head, a plurality of circular cutters secured to the shaft, an arm also secured to the shaft, and readily releasable means carried by the head in engagement with the arm for clamping the same frictionally against the head.

2. In a cutter head, a shaft rotatably mounted in the head in offset slightly canted relation to the axis thereof, a plurality of flat circular cutters secured to the shaft in spaced planes perpendicular to the axis thereof with the cutting edges of the cutters all normally lying in a single plane passing through the axis of the head, an arm also secured to the shaft, and readily releasable means carried by the head in engagement with the arm for holding the same against movement.

3. In a cutter head, a shaft rotatably mounted in the head, a plurality of circular cutters secured to the shaft, a sector-shaped member secured to one end of the shaft in contiguous association with one end of the head, and a machine screw passing through an arcuate slot in said member into a threaded aperture in the head for releasably holding said member against the head in different angular positions.

4. In a cutter head, a shaft rotatably mounted in the head in offset slightly canted relation to the axis thereof, a plurality of flat circular cutters keyed to the shaft in spaced planes perpendicular to the axis thereof with the cutting edges of the cutters all normally lying in a single plane passing through the axis of the head, a polygonal head on one end of the shaft, a sector-shaped member having a polygonal aperture at the center of curvature for non-rotatable engagement with the shaft in contiguous association with one end of the head, and a machine screw passing through an arc-shaped slot in said member into a threaded aperture in the head for releasably holding said member against the head in different angular positions.

In witness whereof I have hereunto subscribed my name.

HARRY S. WALTHERS.